United States Patent [19]
Burroughs

[11] 3,859,837
[45] Jan. 14, 1975

[54] TOOL FOR SECURING CONDUIT ENDS
[76] Inventor: Elvin O. Burroughs, Rt. 2, Box 207, Dexter, Oreg. 97431
[22] Filed: Apr. 18, 1973
[21] Appl. No.: 352,093

[52] U.S. Cl............................ 72/410, 29/237, 29/517
[51] Int. Cl.............................................. B21d 37/12
[58] Field of Search.... 72/410; 81/418, 421, 425 A, 81/425 R; 29/237, 516, 517

[56] References Cited
UNITED STATES PATENTS

| | | | |
|---|---|---|---|
| 2,064,129 | 12/1936 | Temple | 29/517 |
| 2,102,325 | 12/1937 | Kylstra | 29/516 |
| 2,637,236 | 5/1953 | Vergnani et al. | 81/421 |
| 2,710,677 | 6/1955 | Ferris | 29/516 |
| 3,585,704 | 6/1971 | Schroeder | 81/418 |
| 3,688,553 | 9/1972 | Demler | 72/410 |

Primary Examiner—Richard J. Herbst
Assistant Examiner—M. J. Keenan
Attorney, Agent, or Firm—James D. Givnan, Jr.

[57] ABSTRACT

A tool and method for applying a deformable collar for securement of an end segment of a flexible conduit or hose. The tool includes a pair of jaws having wall surfaces of a semi-circular nature for initial placement substantially about the collar wall. The jaws are spaced when initially applied to permit jaw closing movement resulting in a reduction in the collar size. Subsequent application of the jaws to different areas of the collar complete the reduction of collar size causing the conduit end to be firmly engaged with a connector or other tubular element therewithin.

1 Claim, 6 Drawing Figures

PATENTED JAN 14 1975 3,859,837
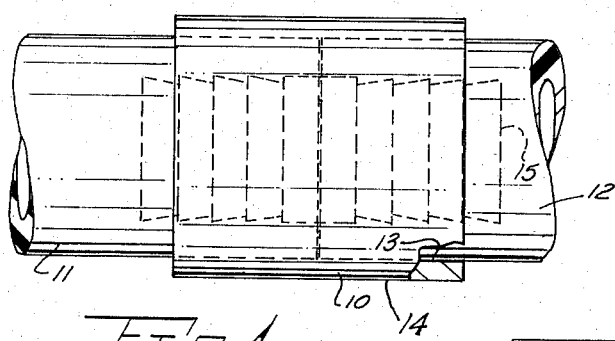
Fig.1
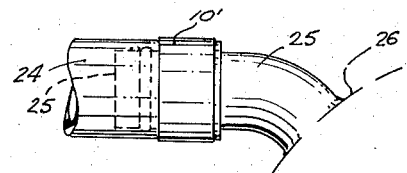
Fig.6
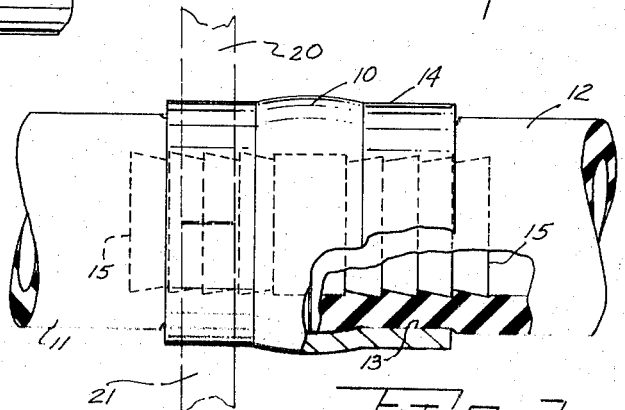
Fig.2
Fig.3
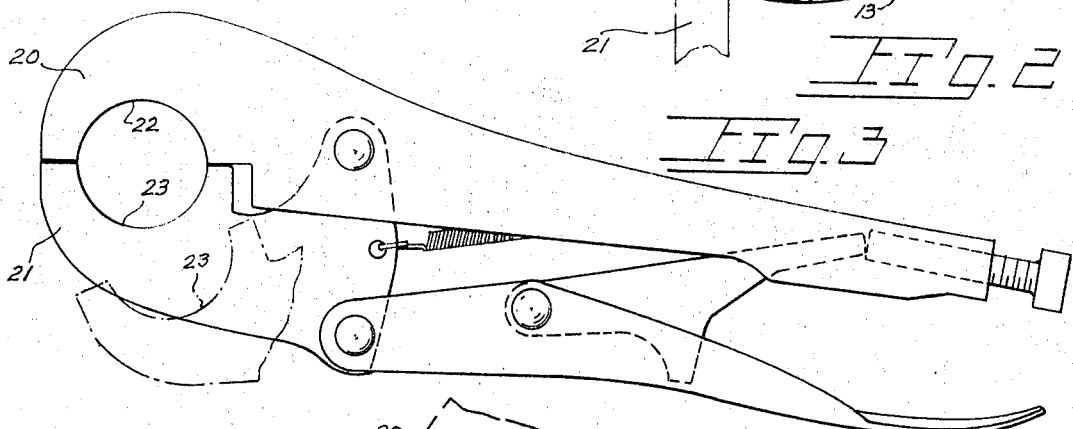
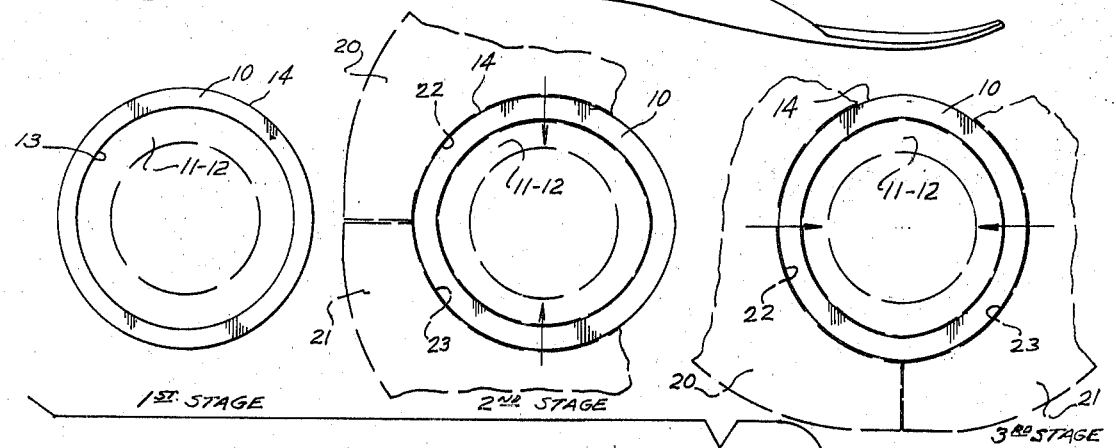
1ST STAGE   2ND STAGE   3RD STAGE
Fig.4
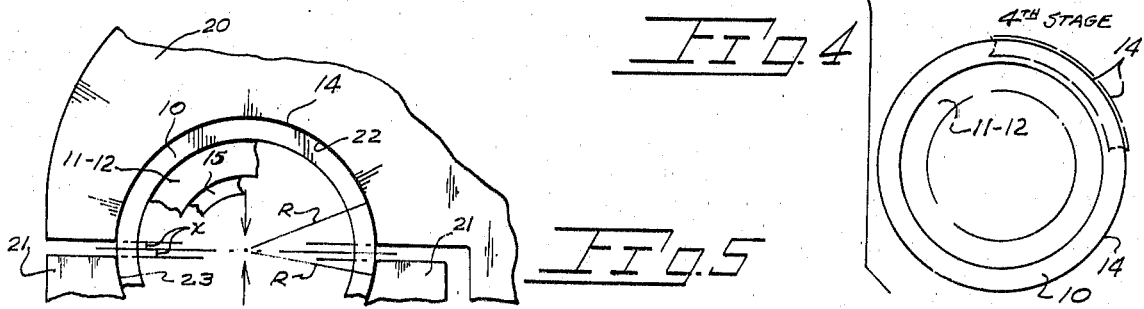
4TH STAGE
Fig.5

TOOL FOR SECURING CONDUIT ENDS

BACKGROUND OF THE INVENTION

The present invention relates to a method and tool for securing a conduit end to an internally disposed member. The ridge member may be in the nature of a connector common to a pair of conduit ends or a tubular extension of a fluid operated device to which a conduit end is to be secured.

Widely used at present for securing the ends of flexible conduits such as for example water and air hoses, are flexible clamps utilizing screw means for closing of the clamp about conduit end compressing same into engagement with an internally disposed ridge coupling. While such clamps are generally satisfactory, they do not require periodic checking and tightening. It is not uncommon for a conduit end to work loose and separate from a connector or tubular fitting after long periods of use during which time the flexible conduit has been subject to both vibration and deterioration. In instances where the conduit is within a vehicular air brake system, the separation results in system malfunction and occasionally severe accidents. Accordingly, it is necessary that periodic tightening of conventional clamps be accomplished which task may or may not be periodically attended to.

Further, conventional clamps do not encase the conduit end to protect same from deteriorating elements such as gasoline, oil, sunlight, etc. Shielding of a conduit end from such elements contributes to longer conduit life. A further problem with existing clamps is that over tightening of same can cause premature failure of the conduit by reason of a shearing action between the clamps edge and the flexible conduit.

SUMMARY OF THE INVENTION

The present invention is embodied within a tool and method for closing a collar about a conduit end to uniformly compress the end into secure engagement with an internal coupling.

The present tool includes cooperating jaws each having a collar contacting wall surface formed on a radius to close the collar about the conduit end during a securing operation. Closure of the collar is accomplished by jaw movement along multiple vectors by sequential application of the tool jaws to the collar. In a closing operation the collar is initially distorted to an out-of-round shape with the collar diameter being reduced in a first direction. Reapplication of the tool jaws about the collar further reduces the collar in section along a second direction normally disposed to the first direction tending to return the collar to a circular shape affecting clamping of the conduit end to a coupling therewithin.

An important objective of the present invention is the provision of a novel method for securing a metal collar to a conduit end for securely fastening the latter to an internallly disposed member. The method may be manually performed in the field by use of a hand operated tool to achieve permanent attachment of the conduit end to an internally disposed member.

A further objective of the present method is to provide for securement of a conduit end within a collar with said collar, in addition to compressing the conduit end, serves to isolate same from conduit deteriorating elements. The method includes the reducing or closing of a collar in a more or less uniform manner about the conduit end as opposed to conventional clamps which are of formed wire or slotted strap construction.

Additionally important to achieving the present objective is a tool having jaw surfaces contactable with and conforming to a circumferential segment of the collar to reduce collar diameter for attachment of the conduit end to an internally disposed coupling. The jaws are applied along different vectors to ultimately achieve reduction of sleeve diameter.

These and other objectives will become readily apparent upon an understanding of the following description.

BRIEF DESCRIPTION OF THE DRAWING

In the accompanying drawings:

FIG. 1 is an elevational view of a collar in place on conduit ends prior to securement, FIG. 2 is a view similar to FIG. 1 subsequent to completion of a securing operation, FIG. 3 is a side elevational view of a tool embodying the present invention, FIG. 4 is a composite end view of a collar at different stages of a securing operation, FIG. 5 is a fragmentory elevational view of a collar and tool jaws prior to closing of the jaws in a securing operation, and FIG. 6 is an elevational view of a collar securing a single conduit end.

DESCRIPTION OF THE PREFERRED EMBODIMENTS

With continuing attention to the accompanying drawing wherein supplied reference numerals indicate parts similarly identified in the following specification, the reference numeral 10 indicates a collar for placement about the end segment of a conduit. Conduit end segments being joined are indicated at 11 and 12 with the conduits being of a resilient nature of the type commonly used for the transmission of a gas or fluids. While indicated in the drawing as being of rubber, the conduits may be of any resilient material used for the above purposes. Collar 10 is of a metallic nature with various metals being suitable as later elaborated upon.

Inner and outer cylindrical wall surfaces of the collar are indicated at 13 and 14. Indicated at 15 is a tubular connector, of conventional shape, in place within each of the conduit end segments and having an irregular surface to faciliate forming of a seal between the conduit and said surface. The foregoing components are of a size to permit there combination assembly by manual effort in what is termed a sliding fit.

With attention of FIGS. 3 and 5, a tool embodying the present invention is disclosed for applying compression forces to collar 10 to bias the conduit end therein into secure engagement with tubular member 15. The tool includes jaws at 20 and 21 each having a curved wall 22 and 23 of less than 180° terminating in chordal end walls for limiting contact with the oppositely located chordal end walls of the opposing jaw. With attention particularly to FIG. 5, it will be seen that each jaw wall is formed on a radius R which conforms to the radius of outer collar surface 14. Accordingly, initial placement of jaws 20 and 21 about the collar results in the curved walls 22 and 23 being in surface contact and extending substantially about the collar wall. With continuing reference to FIG. 5 the tool jaws are shown in pressureless contact with the outer collar wall preparatory to initial closing movement of the jaws.

The hand tool shown may incorporate linkage arrangements for adequate multiplication of force such as that found in a well known tool sold under the trademark VISEGRIP.

The application of compression forces along the vectors indicated by arrows in FIG. 5 results in the collar being reduced in section and temporarily into an out-of-round section as viewed in the second view of composite FIG. 4. The reduction in the collar section biases the conduit asymmetrically into forceful engagement with connector 15. It will be obvious that this first reduction of the collar results in the conduit being compressed with circumferentially spaced apart zones of greater conduit compression. Each jaw 20-21 is dressed off at x approximately 1/32 of an inch from the wall center to achieve such conduit compression.

The third stage of composite FIG. 4 illustrates a subsequent application of tool jaws 20 and 21 to the collar with jaw movement (relative to the collar) being along vectors normal or perpendicular to the first mentioned vectors of the jaw travel. Accordingly, collar 10 will be further reduced to exert an additional biasing force on the conduit end segment.

While the collar temporarily assumes an out-of-round condition when initially compressed within the closed jaws 20 and 21, during the second stage the deformity is remedied to a large extent by subsequent jaw applications. The inherent nature of the thin wall metal collar will permit some flexing allowing the collar to assume circular but reduced section as seen in stage four upon release from the tool. While but two applications of the tool to the collar are shown and described, it is to be understood that repeated applications of jaws 20 and 21 to the collar surface will best serve the present objectives. In such repeated applications, the jaws are repositioned both about and along the collar wall.

The present tool and method are equally adapted to the securing of a conduit end 24 to the tubular fitting 25 of a fluid or gas operated instrumentality 26 as typically shown in FIG. 6. In such instances the collar 10' may be of a lesser length than that shown with the internal member or connector 15 and reduced uniformly along its entire length.

Collar 10 may be of a mild steel or other metal having similar characteristics with a wall thickness of approximately .062 for securing conduits ranging in outside diameter from ½ inch to approximately 1 inch. Obviously the collar wall thickness may be varied within the scope of the invention with determining factors being the degree of force required to reduce the collar as above described. An advantage of the present coupling is that the same may be manually accomplished without the use of stationary machine tools.

While I have shown and described but two forms of the invention it will be apparent to those skilled in the art that the invention may be embodied still otherwise without departing from the spirit and scope of the invention.

I claim:

1. A hand tool for applying a collapsible collar about the end of a resilient conduit to reduce the collar and hence the conduit end into gripping engagement with an internally disposed member, said hand tool including a pair of opposed jaws adapted for relative opening and closing movement, each of said jaws having a curved collar reducing wall formed on equal radii for initial placement in an opposed spaced apart manner on the collar, each of said jaw walls terminating in outwardly directed chordal walls, said chordal walls being in surfacial abutment with one another when the jaws are in a closed position about a reduced collar whereby collar reduction is limited with subsequent application of the jaws to other circumferential collar surfaces further reducing the collar while tending to return same to circular configuration.

* * * * *